US010420106B2

(12) United States Patent
Sun et al.

(10) Patent No.: US 10,420,106 B2
(45) Date of Patent: Sep. 17, 2019

(54) COMMON INFORMATION TRANSMISSION METHOD AND APPARATUS

(71) Applicant: Huawei Technologies Co., Ltd., Shenzhen (CN)

(72) Inventors: Jingyuan Sun, Shenzhen (CN); Lixia Xue, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 86 days.

(21) Appl. No.: 15/661,824

(22) Filed: Jul. 27, 2017

(65) Prior Publication Data
US 2017/0325237 A1 Nov. 9, 2017

Related U.S. Application Data

(63) Continuation of application No. PCT/CN2015/071667, filed on Jan. 27, 2015.

(51) Int. Cl.
*H04W 72/04* (2009.01)

(52) U.S. Cl.
CPC ....... *H04W 72/0453* (2013.01); *H04W 72/04* (2013.01); *H04W 72/042* (2013.01)

(58) Field of Classification Search
CPC ............ H04W 72/04; H04W 72/0453; H04W 72/042; H04W 74/006; H04W 52/243; H04L 1/1812; H04B 1/7143
See application file for complete search history.

(56) References Cited

U.S. PATENT DOCUMENTS

2011/0013542 A1* 1/2011 Yu ................ H04W 74/006
370/280
2011/0085457 A1* 4/2011 Chen ................ H04L 1/1812
370/252
(Continued)

FOREIGN PATENT DOCUMENTS

CN 101374016 A 2/2009
CN 103533657 A 1/2014
(Continued)

OTHER PUBLICATIONS

Machine Translation and Abstract of Chinese Publication No. CN101374016, Feb. 25, 2009, 8 pages.
(Continued)

*Primary Examiner* — Vinncelas Louis
(74) *Attorney, Agent, or Firm* — Conley Rose, P.C.

(57) ABSTRACT

A common information transmission method and an apparatus relate to the communications field, and to reduce repeated sending of common information from a base station to a plurality of user equipments (UEs) during sending of the common information, and improve utilization of resources between the base station and the UEs. The method includes obtaining, by UE, frequency domain location information of a first transmission bandwidth, determining, by the UE, a size and a location of the first transmission bandwidth in a bandwidth of the UE according to the frequency domain location information, where the bandwidth of the UE is one of system bandwidths, and receiving, by the UE over the first transmission bandwidth according to the size and the location of the first transmission bandwidth, common information sent by a base station.

12 Claims, 4 Drawing Sheets

(56) References Cited

U.S. PATENT DOCUMENTS

| | | | | |
|---|---|---|---|---|
| 2012/0113967 A1* | 5/2012 | Smith | ............... | H04B 1/7143 370/338 |
| 2013/0165132 A1* | 6/2013 | Goedken | ............ | H04W 52/243 455/450 |
| 2015/0079981 A1 | 3/2015 | Zhu et al. | | |
| 2015/0156776 A1 | 6/2015 | Chen et al. | | |

FOREIGN PATENT DOCUMENTS

| | | |
|---|---|---|
| CN | 103546920 | 1/2014 |
| WO | 2014033461 A1 | 3/2014 |
| WO | 2014110213 A1 | 7/2014 |
| WO | 2014114920 A1 | 7/2014 |

OTHER PUBLICATIONS

Foreign Communication From a Counterpart Application, PCT Application No. PCT/CN2015/071667, English Translation of International Search Report dated Aug. 26, 2015, 2 pages.

Foreign Communication From a Counterpart Application, PCT Application No. PCT/CN2015/071667, English Translation of Written Opinion dated Aug. 26, 2015, 6 pages.

Ericsson, "Common Control Messages for MTC," 3GPP TSG-RAN WG1 Meeting #78bis, R1-143789, Oct. 6-10, 2014, 6 pages.

Ericsson, "RAR and Paging for MTC," 3GPP TSG RAN WG1 Meeting #79, R1-144562, Nov. 17-21, 2014, 8 pages.

Foreign Communication From a Counterpart Application, European Application No. 15879342.2, Extended European Search Report dated Dec. 4, 2017, 9 pages.

Samsung, "UE complexity reduction considerations for MTC UEs," XP050875184, R1-143871, 3GPP TSG RAN WG1 Meeting #78bis, Oct. 6-10, 2014, 4 pages.

Foreign Communication From a Counterpart Application, European Application No. 15879342.2, Sep. 7, 2018, 7 pages.

Foreign Communication From a Counterpart Application, Japanese Application No. 2017-557240, Japanese Office Action dated Oct. 5, 2018, 2 pages.

Foreign Communication From a Counterpart Application, Japanese Application No. 2017-557240, English Translation of Japanese Office Action dated Oct. 5, 2018, 3 pages.

Foreign Communication From a Counterpart Application, Chinese Application No. 201580038335.5, Chinese Office Action dated Mar. 11, 2019, 9 pages.

Machine Translation and Abstract of Japanese Publication No. JP2017-557240, Japanese Office Action dated Mar. 11, 2019, 2 pages.

Machine Translation and Abstract of Japanese Publication No. JP2017-557240, English Translation of Japanese Office Action dated Mar. 11, 2019, 3 pages.

\* cited by examiner

COMMON INFORMATION TRANSMISSION METHOD AND APPARATUS

CROSS-REFERENCE TO RELATED APPLICATION

This application is a continuation of International Patent Application No. PCT/CN2015/071667 filed on Jan. 27, 2015, which is hereby incorporated by reference in its entirety.

TECHNICAL FIELD

The present disclosure relates to the communications field, and in particular, to a common information transmission method and an apparatus.

BACKGROUND

In a Long Term Evolution (LTE) system, a base station exchanges information with user equipment (UE) using a time-frequency resource in a channel. Further, a frequency resource in the time-frequency resource may be allocated to the base station and the UE in a form of a bandwidth (BW), which is also referred to as a frequency band width, that is, a difference between a highest frequency and a lowest frequency that may be used by a network signal. For example, after first UE is connected to a network, a base station allocates a 5 megahertz (MHz) system bandwidth (the system bandwidth refers to a bandwidth of UE that is already defined in the LTE system) to the first UE, and the system bandwidth is located on physical resource blocks (PRBs) numbered from 0 to 24. Therefore, the base station may send common information to the first UE over the system bandwidth of the first UE in order to interact with the first UE.

As shown in FIG. 1, the common information may be a system information block (SIB), a random access response (RAR), paging information, or information transmitted on a channel such as a physical downlink control channel (PDCCH).

However, for different types of UEs, locations of bandwidths used by the UEs may overlap. For example, a bandwidth of first UE is a first bandwidth (whose size is 5 MHz) of PRBs numbered from 0 to 24, a bandwidth of second UE is a second bandwidth (whose size is 5 MHz) of PRBs numbered from 10 to 34, and there is an overlapped 3 MHz bandwidth between them. Using an example in which a base station sends RAR information to the UEs, in this case, the base station needs to separately send, at a location of a specified RAR resource in the first bandwidth, the RAR information to the first UE, and send, at a location of a specified RAR resource in the second bandwidth, the RAR information to the second UE. Consequently, a communication rate between the base station and the UEs is affected, and signalling overheads of the base station are increased.

SUMMARY

Embodiments of the present disclosure provide a common information transmission method and an apparatus to reduce repeated sending of common information from a base station to multiple UEs during sending of the common information, and improve utilization of resources between the base station and the UE.

To achieve the foregoing objective, the following technical solutions are used in the embodiments of the present disclosure.

According to a first aspect, an embodiment of the present disclosure provides a common information transmission method, including obtaining, by UE, frequency domain location information of a first transmission bandwidth, determining, by the UE, a size and a location of the first transmission bandwidth in a bandwidth of the UE according to the frequency domain location information, where the bandwidth of the UE is one of system bandwidths, and receiving, by the UE over the first transmission bandwidth according to the size and the location of the first transmission bandwidth, common information sent by a base station.

With reference to the first aspect, in a first possible implementation manner of the first aspect, receiving, over the first transmission bandwidth, common information sent by a base station includes receiving, by the UE over the first transmission bandwidth, first common information sent by the base station, where the first common information includes information transmitted using a physical control format indicator channel (PCFICH), a physical hybrid automatic repeat request indicator channel (PHICH), a common PDCCH, or a common enhanced PDCCH (EPDCCH), or receiving, by the UE over the first transmission bandwidth, second common information sent by the base station, where the second common information includes at least one of a SIB, a RAR, or paging information, or receiving, by the UE over the first transmission bandwidth, third common information sent by the base station, where the third common information includes at least one of a master information block (MIB), a primary synchronization signal (PSS), a secondary synchronization signal (SSS), or a discovery reference signal (DRS).

With reference to the first aspect or the first possible implementation manner of the first aspect, in a second possible implementation manner of the first aspect, obtaining, by UE, frequency domain location information of a first transmission bandwidth includes receiving, by the UE, the frequency domain location information that is of the first transmission bandwidth and that is semi-statically transmitted by the base station, or extracting, by the UE, a characteristic signal from the first transmission bandwidth by means of blind detection in order to determine the frequency domain location information of the first transmission bandwidth, where the characteristic signal is used to reflect the size and the location of the first transmission bandwidth.

With reference to any one of the first aspect or the first or the second possible implementation manner of the first aspect, in a third possible implementation manner of the first aspect, there is an overlapping part between the bandwidth of the UE and a bandwidth of at least one UE of other UEs, and the first transmission bandwidth is all or a part of the overlapping part.

With reference to any one of the first to the third possible implementation manners of the first aspect, in a fourth possible implementation manner of the first aspect, receiving, by the UE over the first transmission bandwidth according to the size and the location of the first transmission bandwidth, common information sent by a base station includes receiving, by the UE, first location information that is of the second common information and that is sent by the base station, where the first location information is used to determine a receiving location of the second common information in the bandwidth of the UE, determining, by the UE, a first location of the second common information according to the first location information and a first offset, where the first location is located in the first transmission bandwidth, and the first offset is used to indicate a location offset of the first transmission bandwidth in the bandwidth of the UE, and receiving, by the UE at the first location, the second common information sent by the base station.

With reference to the fourth possible implementation manner of the first aspect, in a fifth possible implementation manner of the first aspect, the method further includes determining, by the UE, the first offset according to the frequency domain location information, or receiving, by the UE, the first offset sent by the base station.

With reference to any one of the first to the third possible implementation manners of the first aspect, in a sixth possible implementation manner of the first aspect, receiving, by the UE over the first transmission bandwidth according to the size and the location of the first transmission bandwidth, common information sent by a base station includes receiving, by the UE, second location information that is of the second common information and that is sent by the base station, where the second location information is used to indicate a receiving location of the second common information in the first transmission bandwidth, determining, by the UE, a second location of the second common information according to the second location information of the second common information, where the second location is located in the first transmission bandwidth, and receiving, by the UE at the second location, the second common information sent by the base station.

With reference to any one of the first aspect or the first to the sixth possible implementation manners of the first aspect, in a seventh possible implementation manner of the first aspect, the size of the first transmission bandwidth is 1.4 MHz, 3 MHz, 5 MHz, 10 MHz, 15 MHz, or 20 MHz.

With reference to any one of the first aspect or the first to the seventh possible implementation manners of the first aspect, in an eighth possible implementation manner of the first aspect, the method further includes receiving, by the UE, information that is about a second offset and that is sent by the base station, where the second offset is used to indicate a location offset that is of a frequency domain location used to transmit uplink information and that is in the bandwidth of the UE, determining, by the UE according to a resource location at which the common information is received and the information about the second offset, an uplink resource location at which the UE sends the uplink information to the base station, and sending, by the UE at the uplink resource location, the uplink information to the base station.

According to a second aspect, an embodiment of the present disclosure provides a common information transmission method, including determining, by a base station, a size and a location of a first transmission bandwidth in a bandwidth of the base station, and sending, by the base station, common information to UE over the first transmission bandwidth according to the size and the location of the first transmission bandwidth in the bandwidth of the base station.

With reference to the second aspect, in a first possible implementation manner of the second aspect, the sending, by the base station, common information to UE over the first transmission bandwidth includes sending, by the base station, first common information to the UE over the first transmission bandwidth, where the first common information includes information transmitted using a PCFICH, a PHICH, a common PDCCH, or a common EPDCCH, or sending, by the base station, second common information to the UE over the first transmission bandwidth, where the second common information includes at least one of an SIB, an RAR, or paging information, or sending, by the base station, third common information to the UE over the first transmission bandwidth, where the third common information includes at least one of an MIB, a PSS, an SSS, or a DRS.

With reference to the second aspect or the first possible implementation manner of the second aspect, in a second possible implementation manner of the second aspect, after determining, by a base station, a size and a location of a first transmission bandwidth in a bandwidth of the base station, the method further includes semi-statically transmitting, by the base station, frequency domain location information to the UE, where the frequency domain location information is used to determine a size and a location of the first transmission bandwidth in a bandwidth of the UE, or sending, by the base station, a characteristic signal to the UE, where the characteristic signal is used to determine a size and a location of the first transmission bandwidth in a bandwidth of the UE.

With reference to any one of the second aspect or the first or the second possible implementation manner of the second aspect, in a third possible implementation manner of the second aspect, there is an overlapping part between the bandwidth of the UE and a bandwidth of at least one UE of other UEs, and the first transmission bandwidth is all or a part of the overlapping part.

With reference to the first possible implementation manner of the second aspect, in a fourth possible implementation manner of the second aspect, sending, by the base station, second common information to the UE over the first transmission bandwidth includes sending, by the base station, first location information to the UE, where the first location information is used to determine a first location of the second common information, and the first location is located in the first transmission bandwidth, and sending, by the base station, the second common information to the UE according to the first location.

With reference to the first possible implementation manner of the second aspect, in a fifth possible implementation manner of the second aspect, sending, by the base station, second common information to UE over the first transmission bandwidth includes sending, by the base station, second location information to the UE, where the second location information is used to indicate a second location of the second common information in the first transmission bandwidth, and sending, by the base station, the second common information to the UE according to the second location.

With reference to any one of the second aspect or the first to the fifth possible implementation manners of the second aspect, in a sixth possible implementation manner of the second aspect, the size of the first transmission bandwidth is 1.4 MHz, 3 MHz, 5 MHz, 10 MHz, 15 MHz, or 20 MHz.

With reference to any one of the second aspect or the first to the sixth possible implementation manners of the second aspect, in a seventh possible implementation manner of the second aspect, after sending, by the base station, common information to UE over the first transmission bandwidth, the method further includes sending, by the base station, information about a second offset to the UE, where the second offset is used to indicate a location offset that is of a frequency domain location used to transmit uplink information and that is in the bandwidth of the UE.

According to a third aspect, an embodiment of the present disclosure provides UE, including a processing unit configured to obtain frequency domain location information of a first transmission bandwidth, and determine a size and a location of the first transmission bandwidth in a bandwidth of the UE according to the frequency domain location information, where the bandwidth of the UE is one of system bandwidths, and a receiving unit configured to receive, over the first transmission bandwidth according to the size and the location of the first transmission bandwidth that are determined by the processing unit, common information sent by a base station.

With reference to the third aspect, in a first possible implementation manner of the third aspect, the common information includes at least one of the common information, first common information, second common information, or third common information, where the first common information includes information transmitted using a PCFICH, a PHICH, a common PDCCH, or a common EPDCCH, or the second common information includes at least one of an SIB, an RAR, or paging information, or the third common information includes at least one of an MIB, a PSS, an SSS, or a DRS.

With reference to the third aspect or the first possible implementation manner of the third aspect, in a second possible implementation manner of the third aspect, the receiving unit is further configured to receive the frequency domain location information that is of the first transmission bandwidth and that is semi-statically transmitted by the base station, and the processing unit is further configured to obtain the frequency domain location information of the first transmission bandwidth using the receiving unit, or the receiving unit is further configured to extract a characteristic signal from the first transmission bandwidth by means of blind detection, and the processing unit is further configured to determine the frequency domain location information of the first transmission bandwidth according to the characteristic signal in the receiving unit, where the characteristic signal is used to reflect the size and the location of the first transmission bandwidth.

With reference to any one of the third aspect or the first or the second possible implementation manner of the third aspect, in a third possible implementation manner of the third aspect, there is an overlapping part between the bandwidth of the UE and a bandwidth of at least one UE of other UEs, and the first transmission bandwidth is all or a part of the overlapping part.

With reference to any one of the third aspect or the first to the third possible implementation manners of the third aspect, in a fourth possible implementation manner of the third aspect, the receiving unit is further configured to receive first location information that is of the second common information and that is sent by the base station, where the first location information is used to determine a receiving location of the second common information in the bandwidth of the UE, the processing unit is further configured to determine a first location of the second common information according to the first location information and a first offset, where the first location is located in the first transmission bandwidth, and the first offset is used to indicate a location offset of the first transmission bandwidth in the bandwidth of the UE, and the receiving unit is further configured to receive, at the first location, the second common information sent by the base station.

With reference to the fourth possible implementation manner of the third aspect, in a fifth possible implementation manner of the third aspect, the receiving unit is further configured to receive the first offset sent by the base station.

With reference to the fourth possible implementation manner of the third aspect, in a sixth possible implementation manner of the third aspect, the processing unit is further configured to determine the first offset according to the frequency domain location information.

With reference to any one of the third aspect or the first to the third possible implementation manners of the third aspect, in a seventh possible implementation manner of the third aspect, the receiving unit is further configured to receive second location information that is of the second common information and that is sent by the base station, where the second location information is used to indicate a receiving location of the second common information in the first transmission bandwidth. The processing unit is further configured to determine a second location of the second common information according to the second location information of the second common information, where the second location is located in the first transmission bandwidth, and the receiving unit is further configured to receive, at the second location, the second common information sent by the base station.

With reference to any one of the third aspect or the first to the seventh possible implementation manners of the third aspect, in an eighth possible implementation manner of the third aspect, the receiving unit is further configured to receive information that is about a second offset and that is sent by the base station, where the second offset is used to indicate a location offset that is of a frequency domain location used to transmit uplink information and that is in the bandwidth of the UE. The processing unit is further configured to determine, according to a resource location at which the common information is received and the information about the second offset, an uplink resource location at which the UE sends the uplink information to the base station, and the UE further includes a sending unit configured to send the uplink information at the uplink resource location.

According to a fourth aspect, an embodiment of the present disclosure provides a base station, including a processing unit configured to determine a size and a location of a first transmission bandwidth in a bandwidth of the base station, and a sending unit configured to send common information to UE over the first transmission bandwidth according to the size and the location of the first transmission bandwidth in the bandwidth of the base station that are determined by the processing unit.

With reference to the fourth aspect, in a first possible implementation manner of the fourth aspect, the common information includes at least one of the following common information first common information, second common information, or third common information, where the first common information includes information transmitted using a PCFICH, a PHICH, a common PDCCH, or a common EPDCCH, or the second common information includes at least one of an SIB, an RAR, or paging information, or the third common information includes at least one of an MIB, a PSS, an SSS, or a DRS.

With reference to the fourth aspect or the first possible implementation manner of the fourth aspect, in a second possible implementation manner of the fourth aspect, the sending unit is further configured to semi-statically transmit frequency domain location information to the UE, where the frequency domain location information is used to determine a size and a location of the first transmission bandwidth in a bandwidth of the UE, or the sending unit is further configured to send a characteristic signal to the UE, where the characteristic signal is used to determine a size and a location of the first transmission bandwidth in a bandwidth of the UE.

With reference to any one of the fourth aspect or the first or the second possible implementation manner of the fourth aspect, in a third possible implementation manner of the fourth aspect, there is an overlapping part between the bandwidth of the UE and a bandwidth of at least one UE of other UEs, and the first transmission bandwidth is all or a part of the overlapping part.

With reference to the second possible implementation manner of the fourth aspect, in a fourth possible implementation manner of the fourth aspect, the sending unit is further configured to send first location information to the UE, where the first location information is used to determine a first location of the second common information. The processing unit is further configured to determine the first location according to the first location information and a first offset, where the first location is located in the first transmission bandwidth, and the first offset is used to indicate a location offset of the first transmission bandwidth in the bandwidth of the UE, and the sending unit is further configured to send the second common information to the UE according to the first location.

With reference to the second possible implementation manner of the fourth aspect, in a fifth possible implementation manner of the fourth aspect, the sending unit is further configured to send second location information to the UE, where the second location information is used to indicate a second location of the second common information in the first transmission bandwidth. The processing unit is further configured to determine the second location according to the second location information, where the second location is located in the first transmission bandwidth, and the sending unit is further configured to send the second common information to the UE according to the second location.

With reference to any one of the fourth aspect or the first to the fifth possible implementation manners of the fourth aspect, in a sixth possible implementation manner of the fourth aspect, the sending unit is further configured to send information about a second offset to the UE, where the second offset is used to indicate a location offset that is of a frequency domain location used to transmit uplink information and that is in the bandwidth of the UE.

In common information transmission method and the apparatus that are provided in the embodiments of the present disclosure, UE obtains frequency domain location information of a first transmission bandwidth, and determines a size and a location of the first transmission bandwidth in a bandwidth of the UE, and then a base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

Embodiment 1

Figure 1:
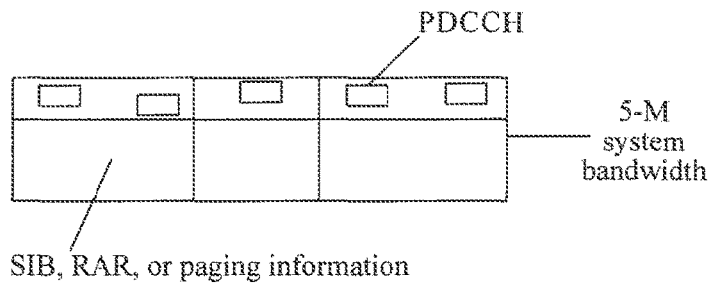
FIG. 1 is a schematic diagram of a transmitting location of common information in a bandwidth of UE.
Figure 2:
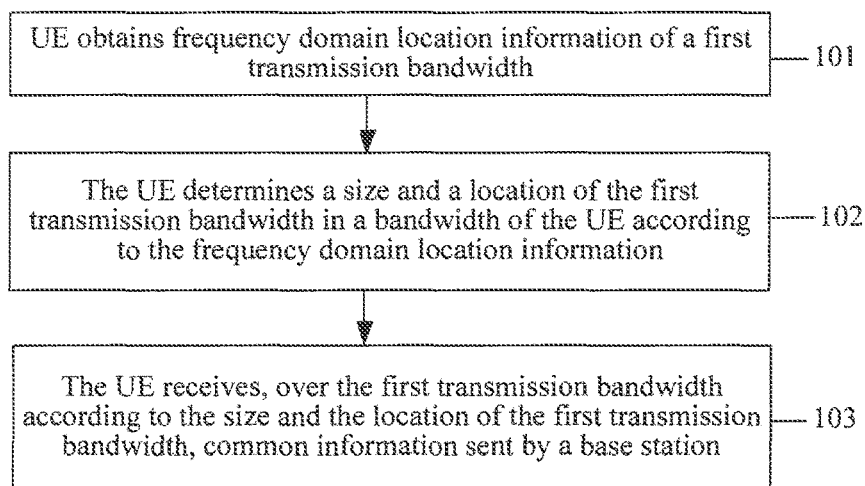
FIG. 2 is a first schematic flowchart of a common information transmission method according to an embodiment of the present disclosure.

This embodiment of the present disclosure provides a common information transmission method. As shown in FIG. 2, the method includes the following steps.

Step 101: UE obtains frequency domain location information of a first transmission bandwidth.

Step 102: The UE determines a size and a location of the first transmission bandwidth in a bandwidth of the UE according to the frequency domain location information.

Step 103: The UE receives, over the first transmission bandwidth according to the size and the location of the first transmission bandwidth, common information sent by a base station.

The common information used in this embodiment of the present disclosure may be classified into three types. Common information sent by the base station over an entire bandwidth of the UE is first common information, such as information transmitted using a PCFICH, a PHICH, a common PDCCH, or a common EPDCCH. Common information sent by the base station over a part of the bandwidth after the base station dynamically performs resource configuration in the entire bandwidth of the UE is second common information, such as an SIB, an RAR, or paging information. In addition, common information sent by the base station over a bandwidth at a specified location in the entire bandwidth of the UE is third common information, such as an MIB, a PSS, an SSS, or a DRS.

Figure 3:
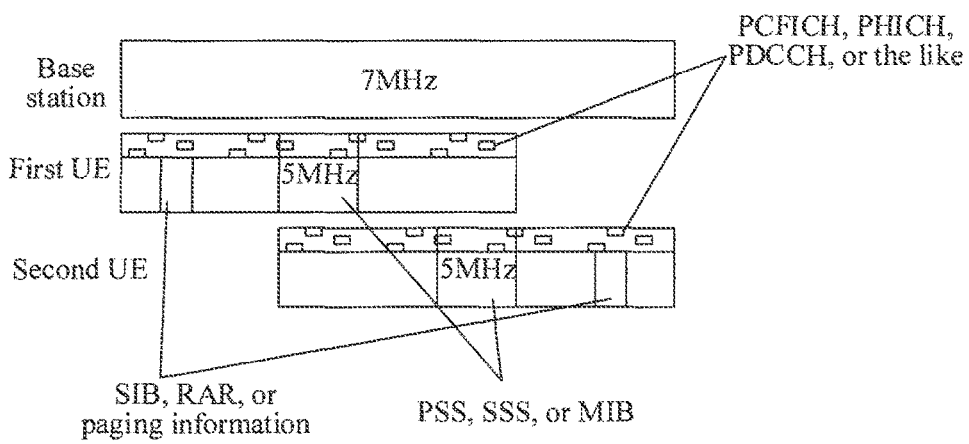
FIG. 3 is a schematic diagram of bandwidth locations of a base station, first UE, and second UE according to an embodiment of the present disclosure.

Further, an LTE system has already defined that there are six sizes for a standard bandwidth (also referred to as a system bandwidth) of UE, that is, 1.4 MHz, 3 MHz, 5 MHz, 10 MHz, 15 MHz, and 20 MHz. However, a bandwidth used on a side of a base station is not equivalent to a bandwidth used by UE. The bandwidth used on the side of the base station may be a non-standard or standard bandwidth. In some cases, different bandwidths used by multiple UEs may overlap. For example, as shown in FIG. 3, a bandwidth used by a base station is a 7 MHz non-standard bandwidth. The 7 MHz bandwidth may be divided into two 5 MHz standard bandwidths. The two 5 MHz standard bandwidths are respectively standard bandwidths used by first UE and second UE, and there is a 3 MHz overlapping bandwidth between the two bandwidths.

When the base station needs to deliver the common information (that is, the first common information, the second common information, or the third common information) to the first UE and the second UE, because locations of system bandwidths used by the first UE and the second UE are different, the base station needs to separately deliver the same common information to the first UE and the second UE. Consequently, a communication rate between the base station and the UE is affected, and signalling overheads of the base station are increased. In addition, when using a resource in the overlapping bandwidth to provide a service for the first UE, the base station cannot use the same resource to provide a service for the second UE. In this case, a cell corresponding to a second bandwidth used by the second UE can be used only as a secondary serving cell, and the cell can serve the second UE only when cooperating with another carrier. Consequently, communication performance between the UE and the base station is affected.

In this embodiment of the present disclosure, a quantity of UEs may be N, where N=1, or N=2, or N=3, or N≥2. When N=2 or N≥2, bandwidths of at least two UEs partially overlap, and the two UEs separately use two different bandwidths or different carriers. In this case, all or a part of an overlapping bandwidth may be used to transmit the common information to the at least two UEs such that the base station may send, in a sharing manner, the common information to the at least two UEs whose bandwidths partially overlap, thereby reducing overheads.

Therefore, by means of the common information transmission method, repeated sending of common information from a base station to multiple UEs during sending of the common information in the prior art is reduced, and utilization of resources between the base station and the UEs is improved.

In step 101, the UE obtains the frequency domain location information of the first transmission bandwidth. The first transmission bandwidth may be M PRBs in the bandwidth of the UE, and the frequency domain location information is used to indicate the location and the size of the first transmission bandwidth, where M>0.

The size of the first transmission bandwidth is less than a size of the bandwidth of the UE (that is, the first transmission bandwidth is located in the bandwidth of the UE). Further, the first transmission bandwidth may be predefined between the UE and the base station, or may be configured by the base station. For example, the UE may receive the frequency domain location information that is of the first transmission bandwidth and that is semi-statically transmitted by the base station, or the UE may extract a characteristic signal from the first transmission bandwidth by means of blind detection in order to determine the frequency domain location information of the first transmission bandwidth. The characteristic signal may include multiple different signals. For example, when a predefined sequence is transmitted on a time-frequency resource unit in two ends of the first transmission bandwidth, the location and the size of the first transmission bandwidth can be obtained as long as the UE detects a location of the sequence. The present disclosure does not limit a specific form of the characteristic signal.

Optionally, the first transmission bandwidth may be formed by M consecutive PRBs overlapping between the bandwidth of the first UE and the bandwidth of the second UE. The first UE and the second UE are UEs occupying different frequency domain locations.

In step 102, after obtaining the frequency domain location information of the first transmission bandwidth, the UE determines the size and the location of the first transmission bandwidth in the bandwidth of the UE according to the frequency domain location information.

Because in step 101, the location of the first transmission bandwidth may be a start location of the first transmission bandwidth in the bandwidth of the UE, or may be an end location of the first transmission bandwidth in the bandwidth of the UE, and the size of the first transmission bandwidth may be several consecutive PRBs, the UE may determine the size and the location of the first transmission bandwidth in the bandwidth of the UE according to the size and the location of the first transmission bandwidth in the frequency domain location information.

For example, still using the first UE and the second UE in FIG. 3 as an example, after obtaining the frequency domain location information of the first transmission bandwidth, the first UE determines, according to the frequency domain location information, 15 consecutive PRBs from the $10^{th}$ PRB to the $24^{th}$ PRB in the standard bandwidth of the first UE as a location of the first transmission bandwidth in the standard bandwidth of the first UE. After obtaining the frequency domain location information of the first transmission bandwidth, the second UE determines, according to the frequency domain location information, 15 consecutive PRBs from the $0^{th}$ to the $14^{th}$ PRBs in the standard bandwidth of the second UE as a location of the first transmission bandwidth in the standard bandwidth of the second UE.

It may be seen that the standard bandwidths of the first UE and the second UE both include the first transmission bandwidth, but the first transmission bandwidth is located in different locations in the respective standard bandwidths of the first UE and the second UE. In addition, a bandwidth used by the base station may be a non-standard bandwidth or a standard bandwidth, and a bandwidth used by the UE may also be a standard bandwidth or a non-standard bandwidth. The present disclosure is described only using an example in which the base station uses a non-standard bandwidth and the UE uses a standard bandwidth. It may be understood that three other cases that are not shown are also applicable to the common information transmission method provided in the present disclosure.

Further, the first transmission bandwidth may be of any size and at any location. For example, the size of the first transmission bandwidth is 3 MHz, 1.4 MHz, 2 MHz, or the like, or the size of the first transmission bandwidth may use a PRB as a unit. For example, the size of the first transmission bandwidth is 15 PRBs, 6 PRBs, 8 PRBs, or the like. Correspondingly, the location of the first transmission bandwidth may be at a center, a left side, a right side, left of the center, or right of the center of the standard bandwidth of the UE.

Preferably, the size of the first transmission bandwidth may be a standard bandwidth already defined in the LTE system, that is, 1.4 MHz, 3 MHz, 5 MHz, 10 MHz, 15 MHz, or 20 MHz. Preferably, a frequency domain structure of the first transmission bandwidth may be the same as a frequency domain structure of a bandwidth having a size the same as the size of the first transmission bandwidth in the LTE system. In this way, the base station does not need to modify an existing configuration parameter for the UE, and even, the UE may be directly connected to the LTE system over the first transmission bandwidth such that the UE can directly serve the UE over the first transmission bandwidth, thereby improving compatibility of the LTE system.

In step 103, after determining the size and the location of the first transmission bandwidth in the bandwidth of the UE, the UE receives, over the first transmission bandwidth, the common information sent by the base station. The common information may be information shared by different UEs occupying the first transmission bandwidth.

Still using the first UE and the second UE in FIG. 3 as an example, after separately determining sizes and locations of the first transmission bandwidth in respective bandwidths of the first UE and the second UE, the first UE and the second UE both receives, over the first transmission bandwidth, common information sent by the base station. The common information may be any one or more of the foregoing first common information, the second common information, or the third common information. In this way, the base station may deliver the common information at once, thereby avoiding problems that because the base station separately sends the common information to each UE, a communication rate is decreased and signalling overheads of the base station are increased. In addition, because the first transmission bandwidth is configured in each UE to receive the common information sent by the base station, no conflict occurs between bandwidth resources used by the UEs, and the base station may separately serve each UE (that is, standalone), thereby improving communication performance between the base station and the UEs.

In addition, when receiving, over the first transmission bandwidth, the second common information sent by the base station, the UE may dynamically configure, over the first transmission bandwidth, a receiving location at which the second common information is received. For example, this embodiment of the present disclosure provides two methods for receiving the second common information.

Further, after determining the size and the location of the first transmission bandwidth in the bandwidth of the UE, the UE may determine a first offset of the first transmission bandwidth according to the location of the first transmission bandwidth in the frequency domain location information and the size of the bandwidth of the UE. The first offset is used to indicate a location offset of the first transmission bandwidth in the bandwidth of the UE.

For example, if the size of the standard bandwidth of the UE is 5 MHz (that is, PRBs numbered from 0 to 24), and the location of the first transmission bandwidth in the standard bandwidth of the UE is from the $10^{th}$ PRB to the $24^{th}$ PRB, the first offset is 10 (that is, 10–0=10) PRBs.

In this way, when the UE receives, over the first transmission bandwidth, first location information sent by the base station, because the resource location information may be used to determine a receiving location of the second common information in the bandwidth of the UE, the UE may determine, according to the first location information and the first offset, a first location of the second common information in the bandwidth of the UE.

For example, if the first location information sent by the base station indicates that the base station sends the second common information on the $0^{th}$ to the $2^{nd}$ PRBs of the first transmission bandwidth, and the first offset of the UE is 10 PRBs, the first location (that is, an actual receiving location in the bandwidth of the UE) of the second common information in the bandwidth of the UE is the $10^{th}$ to the $12^{th}$ PRBs in the bandwidth of the UE such that the UE may receive, at the first location (that is, the $10^{th}$ to the $12^{th}$ PRBs) in the bandwidth of the UE, the second common information sent by the base station.

The first location information may be information shared by UEs receiving the second common information, or the resource location information may be information sent to all UEs receiving the second common information.

In another method for receiving the second common information provided in this embodiment of the present disclosure, before receiving the second common information, the UE may perform resource division over the first transmission bandwidth based on a resource granularity of a given size according to a requirement. In this way, the UE may directly receive second location information that is of the second common information and that is sent by the base station. Because the second location information is used to indicate a receiving location of the second common information in the first transmission bandwidth, but not a location of the second common information in the entire bandwidth of the UE, the UE may directly determine a second location of the second common information in the first transmission bandwidth according to the second location information in order to receive, at the second receiving location, the second common information sent by the base station.

Further, after receiving, over the first transmission bandwidth, the common information sent by the base station, the UE may also send corresponding uplink information to the base station.

Because a resource used by the UE to receive the common information (that is, downlink information) sent by the base station and a resource used by the UE to send the uplink information to the base station need to satisfy a particular mapping relationship (for example, if the UE uses the $X^{th}$ PRB to receive the downlink information, the UE uses the $(X+Y)^{th}$ PRB to send the corresponding uplink information, where X and Y are integers. It should be noted that the mapping relationship is not limited thereto, and this is not limited in the present disclosure.), when UE that receives the downlink information over the first transmission bandwidth and UE that does not receive the downlink information over the first transmission bandwidth send the uplink information, a conflict may occur between bandwidth resources (that is, uplink resource locations).

In this case, the UE may determine a second offset according to information that is about the second offset and that is sent by the base station, where the second offset is used to determine a relative location that is of a frequency domain location used to transmit the uplink information and that is in the bandwidth of the UE. Then the UE may determine, according to a resource location of the received common information and the second offset, an uplink resource location at which the uplink information is sent to the base station. Finally, the UE may send the uplink information to the base station at the uplink resource location. In this way, multiple UEs that receive the second common information over the first transmission bandwidth may determine, according to different second offsets, uplink resource locations used for sending respective uplink information of the multiple UEs, thereby ensuring that no conflict occurs between uplink resource locations used by various types of UEs to send respective uplink information of the UEs to the base station.

In the common information transmission method provided in this embodiment of the present disclosure, UE obtains frequency domain location information of a first transmission bandwidth, and determines a size and a location of the first transmission bandwidth in a bandwidth of the UE, and then a base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

Embodiment 2

Figure 4:
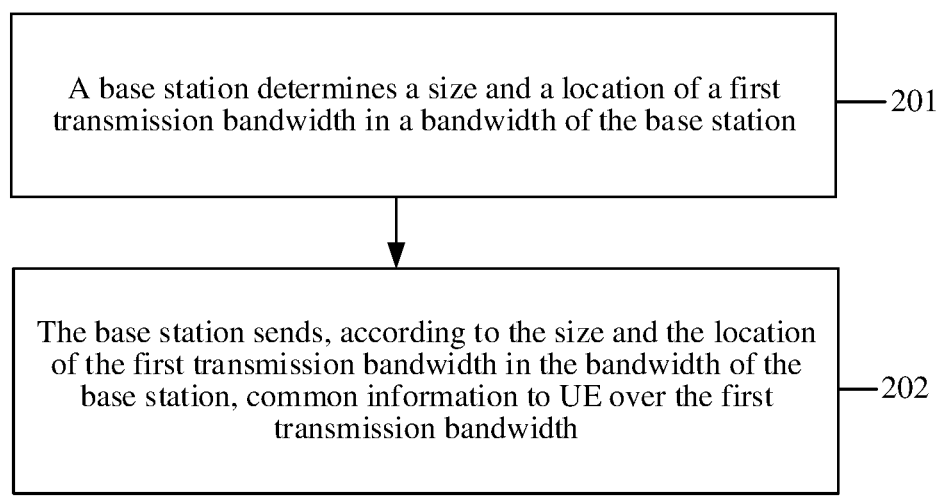
FIG. 4 is a second schematic flowchart of a common information transmission method according to an embodiment of the present disclosure.

This embodiment of the present disclosure provides a common information transmission method. As shown in FIG. 4, the method includes the following steps.

Step 201: A base station determines a size and a location of a first transmission bandwidth in a bandwidth of the base station.

Step 202: The base station sends, according to the size and the location of the first transmission bandwidth in the bandwidth of the base station, common information to UE over the first transmission bandwidth.

Similar to step 101 to step 103 in the foregoing embodiment, the common information used in this embodiment of the present disclosure also includes first common information transmitted using a PCFICH, a PHICH, a common PDCCH, or a common EPDCCH, or second common information, such as at least one of an SIB, an RAR, or paging information, sent over a part of a bandwidth after the base station dynamically performs resource configuration in the entire bandwidth of the UE, or third common information, such as an MIB, a PSS, an SSS, or a DRS, sent by the base station over a bandwidth at a specified location in the entire bandwidth of the UE.

In step 201, before delivering the common information to the UE, the base station needs to determine the size and the location of the first transmission bandwidth in the bandwidth of the base station. For example, a bandwidth used by the base station is a 7 MHz non-standard bandwidth, and the first transmission bandwidth is located on the 14$^{th}$ PRB to the 24$^{th}$ PRB in the 7 MHz non-standard bandwidth, and is totally 2 MHz.

Further, the base station determines frequency domain location information of the first transmission bandwidth, where the frequency domain location information is used to indicate a size and a location of the first transmission bandwidth in the bandwidth of the UE. In this way, the base station may semi-statically transmit the frequency domain location information to the UE such that the UE determines the size and the location of the first transmission bandwidth in the bandwidth of the UE according to the frequency domain location information, and the base station sends the common information to the UE over the first transmission bandwidth.

Alternatively, the base station may also send a characteristic signal to the UE such that the UE may perform blind detection according to the characteristic signal, and the UE finally determines the size and the location of the first transmission bandwidth in the bandwidth of the UE according to a result of the blind detection such that the base station sends the common information to the UE over the first transmission bandwidth.

The size of the first transmission bandwidth is less than a size of the bandwidth of the UE (that is, the first transmission bandwidth is located in the bandwidth of the UE). In this embodiment of the present disclosure, a quantity of UEs may be N, where N=1, or N=2, or N=3, or N≥2. When N=2 or N≥2, bandwidths of at least two UEs partially overlap, and the two UEs separately use two different bandwidths or different carriers. In this case, all or a part of an overlapping bandwidth may be used to transmit the common information to the at least two UEs such that the base station may send, in a sharing manner, the common information to the at least two UEs whose bandwidths partially overlap, thereby reducing overheads.

Further, the first transmission bandwidth may be of any size and at any location. For example, the size of the first transmission bandwidth is 3 MHz, 1.4 MHz, 2 MHz, or the like, or the size of the first transmission bandwidth may use a PRB as a unit. For example, the size of the first transmission bandwidth is 15 PRBs, 6 PRBs, 8 PRBs, or the like. Correspondingly, the location of the first transmission bandwidth may be at a center, a left side, a right side, left of the center, or right of the center of the standard bandwidth of the UE.

Preferably, the size of the first transmission bandwidth may be a standard bandwidth already defined in the LTE system, that is, 1.4 MHz, 3 MHz, 5 MHz, 10 MHz, 15 MHz, or 20 MHz. Preferably, a frequency domain structure of the first transmission bandwidth may also be the same as a frequency domain structure of a bandwidth having a size the same as the size of the first transmission bandwidth in the LTE system. In this way, the base station does not need to modify an existing configuration parameter for the UE, and even, the UE may be directly connected to the LTE system over the first transmission bandwidth such that the UE may directly serve the UE over the first transmission bandwidth, thereby improving compatibility of the LTE system.

In step 202, after the UE determines the size and the location of the first transmission bandwidth in the bandwidth of the UE according to the frequency domain location information, the base station sends the common information (the first common information, the second common information, or the third common information) to the UE over the first transmission bandwidth at the same time. Herein, there may be multiple UEs.

Further, using first UE and second UE in FIG. 3 as an example, after separately determining sizes and locations of the first transmission bandwidth in respective bandwidths of the first UE and the second UE, the first UE and the second UE both receive, over the first transmission bandwidth, the common information sent by the base station. In this way, the base station may deliver the common information to the first UE and the second UE at once, thereby avoiding problems that because the base station separately sends the common information to each UE, a communication rate is decreased and signalling overheads of the base station are increased. In addition, because the first transmission bandwidth is configured in each UE to receive the common information sent by the base station, no conflict occurs between bandwidth resources used by the UEs, and the base station may separately serve each UE, thereby improving communication performance between the base station and the UEs.

In addition, when sending the second common information to multiple UEs over the first transmission bandwidth, the base station may dynamically configure, over the first transmission bandwidth, a bandwidth location at which the UE receives the second common information. For example, this embodiment of the present disclosure provides two methods configured by the base station for the UE to receive the second common information.

In a first method, after determining the size and the location of the first transmission bandwidth in the bandwidth of the UE, the UE may determine a first offset of the first transmission bandwidth according to the location of the first transmission bandwidth and a size of the bandwidth of the UE. The first offset is used to indicate a location offset of the first transmission bandwidth in the bandwidth of the UE. For example, if the size of the standard bandwidth of the UE is 5 MHz (that is, PRBs numbered from 0 to 24), and the location of the first transmission bandwidth in the standard bandwidth of the UE is from the $10^{th}$ PRB to the $24^{th}$ PRB, the first offset is 10 PRBs.

In this way, the base station may send first location information to the UE such that the UE determines, according to the first location information and the first offset that is already determined by the UE, a first location at which the second common information is received in the bandwidth of the UE. Therefore, the base station may send the second common information to the UE at the first receiving location.

For example, if the first location information sent by the base station indicates that the base station sends the second common information on the $0^{th}$ to the $2^{nd}$ PRBs of the first transmission bandwidth, and the first offset of the UE is 10 PRBs, the first location of the second common information in the bandwidth of the UE is the $10^{th}$ to the $12^{th}$ PRBs in the bandwidth of the UE such that the UE may receive, at the first location (that is, the $10^{th}$ to the $12^{th}$ PRBs) in the bandwidth of the UE, the second common information sent by the base station.

The first location information may be information shared by UEs receiving the second common information, or the first location information may be information sent to all UEs receiving the second common information.

In another method for receiving the second common information provided in this embodiment of the present disclosure, before receiving the second common information, the UE may perform resource division over the first transmission bandwidth based on a resource granularity of a given size according to a requirement. In this way, the UE may directly receive second location information that is of the second common information and that is sent by the base station. Because the second location information is used to indicate a location of the second common information in the first transmission bandwidth, but not a location of the second common information in the entire bandwidth of the UE, the UE may directly determine a second receiving location of the second common information in the first transmission bandwidth according to the second location information in order to receive, at the first receiving location, the second common information sent by the base station.

Further, after receiving, over the first transmission bandwidth, the common information sent by the base station, the UE may also send corresponding uplink information to the base station.

Because a resource used by the UE to receive the common information (that is, downlink information) sent by the base station and a resource used by the UE to send the uplink information to the base station need to satisfy a particular mapping relationship, (for example, if the UE uses the $X^{th}$ PRB to receive the downlink information, the UE uses the $(X+Y)^{th}$ PRB to send the corresponding uplink information, where X and Y are integers. It should be noted that the mapping relationship is not limited thereto, and this is not limited in the present disclosure), when UE that receives the downlink information over the first transmission bandwidth and UE that does not receive the downlink information over the first transmission bandwidth send the uplink information, a conflict may occur between bandwidth resources (that is, uplink resource locations).

In this case, the UE may determine a second offset according to information that is about the second offset and that is sent by the base station, where the second offset is used to determine a relative location that is of a frequency domain location used to transmit the uplink information and that is in the bandwidth of the UE. Then the UE may determine, according to a resource location of the received common information and the second offset, an uplink resource location at which the uplink information is sent to the base station. Finally, the UE may send the uplink information to the base station at the uplink resource location. In this way, multiple UEs that receive the second common information over the first transmission bandwidth may determine, according to different second offsets, uplink resource locations used for sending respective uplink information of the multiple UEs, thereby ensuring that no conflict occurs between uplink resource locations used by various types of UEs to send respective uplink information of the UEs to the base station.

In the common information transmission method provided in this embodiment of the present disclosure, UE obtains frequency domain location information of a first transmission bandwidth, and determines a size and a location of the first transmission bandwidth in a bandwidth of the UE, and then a base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

Embodiment 3

Figure 5:
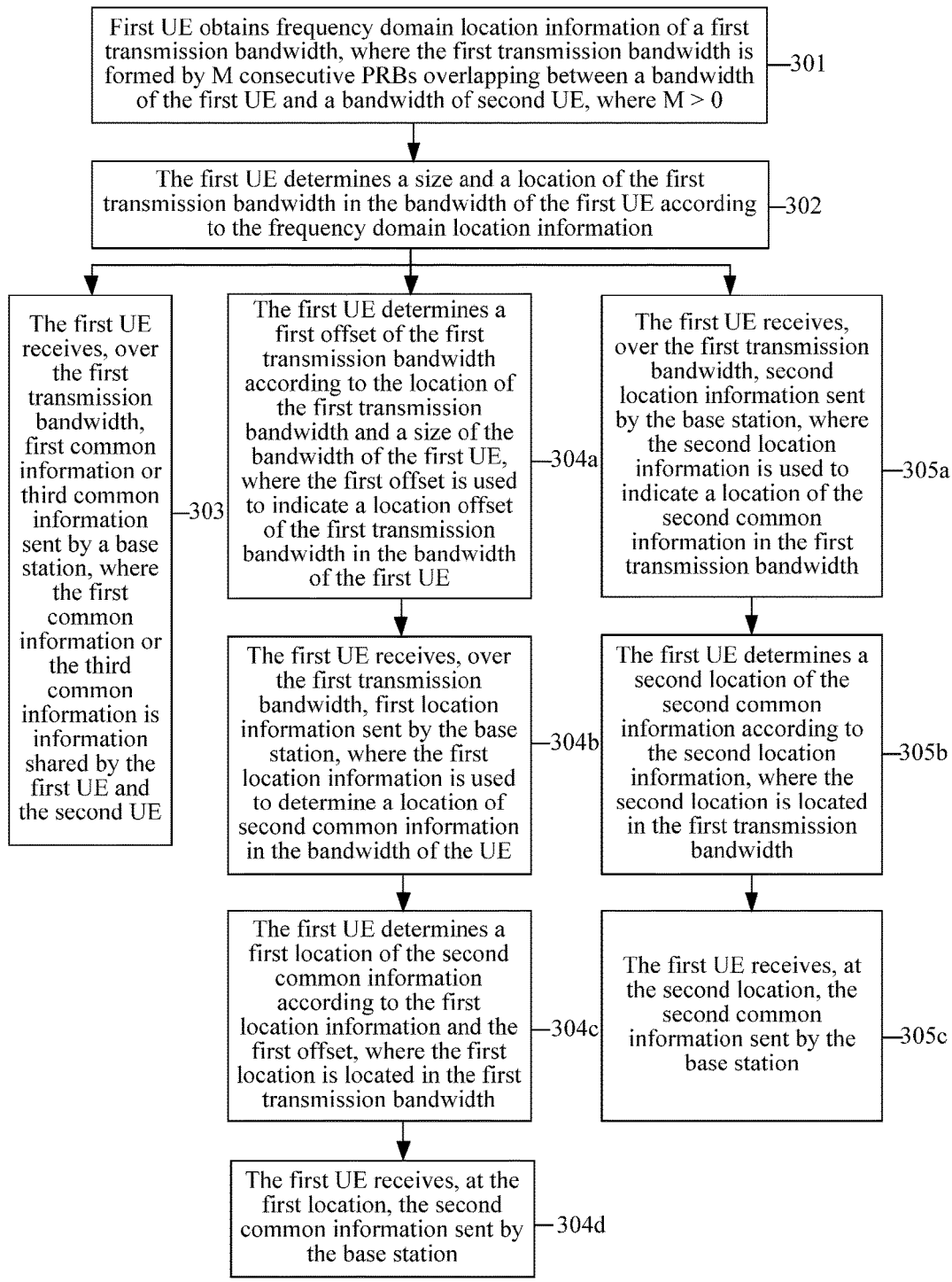
FIG. 5 is a third schematic flowchart of a common information transmission method according to an embodiment of the present disclosure.

This embodiment of the present disclosure provides a common information transmission method. As shown in FIG. 5, the method includes the following steps.

Step 301: First UE obtains frequency domain location information of a first transmission bandwidth, where the first transmission bandwidth is formed by M consecutive PRBs overlapping between a bandwidth of the first UE and a bandwidth of second UE, and M>0.

Step 302: The first UE determines a size and a location of the first transmission bandwidth in the bandwidth of the first UE according to the frequency domain location information.

Step 303: The first UE receives, over the first transmission bandwidth, first common information or third common information sent by a base station, where the first common information or the third common information is information shared by the first UE and the second UE.

Step 304a: The first UE determines a first offset of the first transmission bandwidth according to the location of the first transmission bandwidth and a size of the bandwidth of the first UE, where the first offset is used to indicate a location offset of the first transmission bandwidth in the bandwidth of the first UE.

Step 304b: The first UE receives, over the first transmission bandwidth, first location information sent by the base station, where the first location information is used to determine a location of second common information in the bandwidth of the UE.

Step 304c: The first UE determines a first location of the second common information according to the first location information and the first offset, where the first location is located in the first transmission bandwidth.

Step 304d: The first UE receives, at the first location, the second common information sent by the base station.

Step 305a: The first UE receives, over the first transmission bandwidth, second location information sent by the base station, where the second location information is used to indicate a location of the second common information in the first transmission bandwidth.

Step 305b: The first UE determines a second location of the second common information according to the second location information, where the second location is located in the first transmission bandwidth.

Step 305c: The first UE receives, at the second location, the second common information sent by the base station.

In step 301, the first UE obtains the frequency domain location information of the first transmission bandwidth, where the first transmission bandwidth is M PRBs in the bandwidth of the first UE. Preferably, the first transmission bandwidth may be formed by the M consecutive PRBs overlapping between the bandwidth of first UE and the bandwidth of the second UE The size of the first transmission bandwidth is less than the size of the bandwidth of the first UE (that is, the first transmission bandwidth is located in the bandwidth of the first UE). Similarly, the size of the first transmission bandwidth is also less than a size of the bandwidth of the second UE. Further, the UE may receive the frequency domain location information that is of the first transmission bandwidth and that is semi-statically transmitted by the base station, or the UE may perform blind detection by extracting a characteristic signal from the first transmission bandwidth in order to determine the frequency domain location information of the first transmission bandwidth.

In step 302, after obtaining the frequency domain location information of the first transmission bandwidth, the first UE determines the size and the location of the first transmission bandwidth in the bandwidth of the first UE according to the frequency domain location information.

For example, after obtaining the frequency domain location information of the first transmission bandwidth, the first UE determines, according to the frequency domain location information, 15 consecutive PRBs from the $10^{th}$ PRB to the $24^{th}$ PRB in the standard bandwidth of the first UE as a location of the first transmission bandwidth in the standard bandwidth of the first UE. After obtaining the frequency domain location information of the first transmission bandwidth, the second UE determines, according to the frequency domain location information, 15 consecutive PRBs from the $0^{th}$ to the $14^{th}$ PRBs in the standard bandwidth of the second UE as a location of the first transmission bandwidth in the standard bandwidth of the second UE.

It may be seen that the standard bandwidths of the first UE and the second UE both include the first transmission bandwidth, but the first transmission bandwidth is located in different locations in the respective standard bandwidths of the first UE and the second UE.

Preferably, the size of the first transmission bandwidth may be a standard bandwidth already defined in an LTE system, that is, 1.4 MHz, 3 MHz, 5 MHz, 10 MHz, 15 MHz, or 20 MHz. Preferably, a frequency domain structure of the first transmission bandwidth may also be the same as a frequency domain structure of a bandwidth having a size the same as the size of the first transmission bandwidth in the LTE system. In this way, the base station does not need to modify an existing configuration parameter for the first UE, and even, the first UE may be directly connected to the LTE system over the first transmission bandwidth such that the first UE may directly serve the UE over the first transmission bandwidth, thereby improving compatibility of the LTE system.

After step 302 is performed, the first UE may receive, over the determined first transmission bandwidth, the common information sent by the base station. The common information may be classified into three types. Common information sent by the base station in an entire bandwidth of the UE is first common information, such as information transmitted using a PCFICH, a PHICH, a common PDCCH, or a common EPDCCH. Common information sent by the base station over a part of the bandwidth after the base station dynamically performs resource configuration in the entire bandwidth of the UE is second common information, such as an SIB, an RAR, or paging information. In addition, common information sent by the base station over a bandwidth at a specified location in the entire bandwidth of the UE is third common information, such as an MIB, a PSS, an SSS, or a DRS. For example, the MIB, the PSS, or the SSS may be sent on 72 subcarriers in a center of the first transmission bandwidth, the PSS or the SSS in the DRS may be sent on 72 subcarriers in the center of the first transmission bandwidth, and a channel state information-reference signal (CSI-RS) in the DRS may be sent on all PRBs of the first transmission bandwidth.

It may be seen that, because transmission of the second common information needs to be dynamically configured by the base station, this embodiment of the present disclosure provides two methods for receiving the second common information, that is, step 304a to step 304d and step 305a to step 305c. When the first UE receives, over the first transmission bandwidth, the first common information or the third common information sent by the base station, step 303 may be performed.

In step 303, after separately determining sizes and locations of the first transmission bandwidth in the respective bandwidths of the first UE and the second UE, the first UE and the second UE both receives, over the first transmission bandwidth, the first common information or the third common information sent by the base station. In this way, the base station may deliver the first common information or the third common information at once, thereby avoiding problems that because the base station separately sends the common information to the first UE and the second UE, a communication rate is decreased and signalling overheads of the base station are increased. In addition, because the first transmission bandwidth is configured in each UE to receive the first common information or the third common information sent by the base station, no conflict occurs between bandwidth resources used by the UEs, and the base station may separately serve each UE, thereby improving communication performance between the base station and the UEs.

In step 304a, because transmission of the second common information needs to be dynamically configured by the base station, after determining the size and the location of the first transmission bandwidth in the bandwidth of the first UE, the first UE may determine the first offset of the first UE according to the location of the first transmission bandwidth and the size of the bandwidth of the first UE, where the first offset is used to indicate the location offset of the first transmission bandwidth in the bandwidth of the first UE.

For example, if a size of the standard bandwidth of the first UE is 5 MHz (that is, PRBs numbered from 0 to 24), and the location of the first transmission bandwidth in the standard bandwidth of the first UE is from the $10^{th}$ PRB to the $24^{th}$ PRB, the first offset is 10 PRB s.

In addition, the first UE and/or the second UE may also directly determine, by receiving the first offset sent by the base station, a location offset of the first transmission bandwidth in the bandwidth of the first UE and/or the second UE.

In step 304*b*, the first UE receives, over the first transmission bandwidth, the first location information sent by the base station, where the first location information is used to determine the location of the second common information in the bandwidth of the UE. For example, the first location information sent by the base station indicates that the base station sends the second common information on the $0^{th}$ to the $2^{nd}$ PRBs of the first transmission bandwidth.

Further, the first location information may be information shared by UEs receiving the second common information, or the first location information may be information sent to all UEs receiving the second common information.

In step 304*c*, after receiving, over the first transmission bandwidth, the first location information sent by the base station, the first UE determines the first location of the second common information according to the first location information and the first offset, where the first location is located in the first transmission bandwidth.

Still using an example in the foregoing step 304*a* and step 304*b*, the first location information sent by the base station indicates that the base station sends the second common information on the $0^{th}$ to the $2^{nd}$ PRBs of the first transmission bandwidth, and the first offset of the first UE is 10 PRBs. Therefore, the first location (that is, an actual resource location) of the second common information in the bandwidth of the first UE is the $10^{th}$ to the $12^{th}$ PRBs in the bandwidth of the first UE.

Similarly, the second UE may also use the same method to determine a first location of the second common information in the bandwidth of the second UE. For example, if first location information sent by the base station to the second UE indicates that the base station sends the second common information on the $0^{th}$ to the $2^{nd}$ PRBs of the first transmission bandwidth, and a first offset for the second UE is 9 PRBs, for the second UE, the first location at which the second UE receives the second common information in the bandwidth of the second UE is the $9^{th}$ to the $11^{th}$ PRBs in the bandwidth of the second UE. However, in the first transmission bandwidth, a location of the $9^{th}$ to the $11^{th}$ PRBs in the bandwidth of the second UE is the same as a location of the $10^{th}$ to the $12^{th}$ PRBs in the bandwidth of the first UE, and both locations are the $0^{th}$ to the $2^{nd}$ PRBs of the first transmission bandwidth. Therefore, it may be seen that although the first UE and the second UE receive the second common information at different locations in respective bandwidths of the first UE and the second UE, for the base station, the first location at which the second UE receives the second common information and the first location at which the first UE receives the second common information are actually the $0^{th}$ to the $2^{nd}$ PRBs of the first transmission bandwidth. Therefore, the base station may deliver the second common information at once in order to ensure that the first UE and the second UE both receive the second common information.

In step 304*d*, after determining the first location of the second common information, the first UE receives, at the first receiving location, the second common information sent by the base station.

Correspondingly, after the second UE determines an actual resource location of the second common information in the bandwidth of the second UE, the second UE receives, at the actual resource location, the second common information sent by the base station. Because actual resource locations at which the second common information is received and that are determined by the first UE and the second UE are the same, the base station may deliver the second common information to the first UE and the second UE at the same time, thereby reducing resource overheads on a side of the base station.

In step 305*a*, when receiving the second common information sent by the base station, the first UE does not need to determine the first offset, but performs resource division based on a resource granularity of a given size according to a requirement. For example, a 3 MHz first transmission bandwidth is divided into 15 PRBs according to a granularity of the PRB.

In this way, the first UE may directly receive, over the first transmission bandwidth, the second location information that is of the second common information and that is sent by the base station, where the second location information is used to indicate a receiving location of the second common information in the first transmission bandwidth. For example, location information of the second common information indicates that the first UE receives the second common information over a second transmission sub-bandwidth of the first transmission bandwidth.

Certainly, there are multiple methods for performing resource division over the first transmission bandwidth based on a resource granularity of a given size according to a requirement, and this is not limited in the present disclosure. Optionally, a method for performing resource division over the first transmission bandwidth may use a bandwidth resource division method of the first UE in order to improve compatibility of the LTE system.

In step 305*b*, the first UE determines the second location of the second common information according to the second location information, where the second location is located in the first transmission bandwidth.

Similarly, the second UE may also use the foregoing method to determine the location (that is, an actual receiving location in the first transmission bandwidth) of the second common information in the second UE, and for the base station, the second location at which the second UE receives the second common information is actually the same as the second location at which the first UE receives the second common information.

In step 305*c*, when determining the second location of the second common information in the first transmission bandwidth, the first UE may receive, at the second receiving location, the second common information sent by the base station.

It may be seen that the base station may perform the method in step 304*a* to step 304*d* or step 305*a* to step 305*c* to deliver the second common information to multiple UEs at the same time, thereby reducing signalling overheads of the base station.

Further, after receiving, over the first transmission bandwidth, the common information sent by the base station, the first UE may also send corresponding uplink information to the base station.

Because a resource used by the first UE to receive the common information (that is, downlink information) sent by the base station and a resource used by the first UE to send the uplink information to the base station need to satisfy a particular mapping relationship (for example, if the first UE uses the $X^{th}$ PRB to receive the downlink information, the first UE uses the $(X+Y)^{th}$ PRB to send the corresponding uplink information, where X and Y are integers. It should be noted that the mapping relationship is not limited thereto, and this is not limited in the present disclosure.), when UE that receives the downlink information over the first transmission bandwidth and UE that does not receive the downlink information over the first transmission bandwidth send the uplink information, a conflict may occur between bandwidth resources (that is, uplink resource locations).

In this case, the first UE may determine a second offset according to information that is about the second offset and that is sent by the base station, where the second offset is used to determine a relative location that is of a frequency domain location used to transmit the uplink information and that is in the bandwidth of the first UE. Then the first UE may determine, according to a resource location of the received common information and the second offset, an uplink resource location at which the first UE sends the uplink information to the base station. Finally, the first UE may send the uplink information to the base station at the uplink resource location. In this way, multiple UEs that receive the second common information over the first transmission bandwidth may determine, according to different second offsets, uplink resource locations used for sending respective uplink information of the multiple UEs, thereby ensuring that no conflict occurs between uplink resource locations used by various types of UEs to send respective uplink information of the UEs to the base station.

In the common information transmission method provided in this embodiment of the present disclosure, UE obtains frequency domain location information of a first transmission bandwidth, and determines a size and a location of the first transmission bandwidth in a bandwidth of the UE, and then a base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

Embodiment 4

Figure 6:
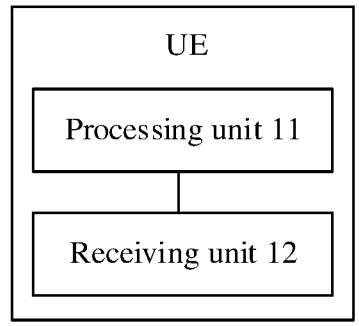
FIG. 6 is a first schematic structural diagram of UE according to an embodiment of the present disclosure.

As shown in FIG. 6, FIG. 6 is a schematic structural diagram of a UE according to this embodiment of the present disclosure. The UE includes a processing unit 11 configured to obtain frequency domain location information of a first transmission bandwidth, and determine a size and a location of the first transmission bandwidth in a bandwidth of the UE according to the frequency domain location information, where the bandwidth of the UE is one of system bandwidths, and a receiving unit 12 configured to receive, over the first transmission bandwidth according to the size and the location of the first transmission bandwidth that are determined by the processing unit 11, common information sent by a base station.

Optionally, the processing unit 11 used in this embodiment of the present disclosure may be a processor in the UE, and the receiving unit 12 may be any communications interface in the UE. The processor and the communications interface may be connected to and communicate with each other using a bus. The processor is a control center of the UE. The processor performs various functions of the UE by processing data received by the communications interface. The communications interface may be implemented using an optical communications interface, an electrical communications interface, a wireless communications interface, or any combination thereof. For example, the optical communications interface may be a small form-factor pluggable (SFP) communications interface (for example, a transceiver), an enhanced SFP (SFP+) communications interface, or a 10 Gigabit SFP (XFP) communications interface. The electrical communications interface may be an Ethernet network interface controller (NIC). The wireless communications interface may be a wireless NIC (WNIC). In addition, the UE may have multiple communications interfaces.

Further, the common information received by the receiving unit 12 includes at least one of the common information, first common information, second common information, or third common information, where the first common information includes information transmitted using a PCFICH, a PHICH, a PDCCH, or an EPDCCH, or the second common information includes at least one of an SIB, an RAR, or paging information, or the third common information includes at least one of an MIB, a PSS, an SSS, or a DRS.

Further, that the processing unit 11 obtains the frequency domain location information of the first transmission bandwidth may further include the receiving unit 12 being further configured to receive the frequency domain location information that is of the first transmission bandwidth and that is semi-statically transmitted by the base station, and the processing unit 11 being further configured to obtain the frequency domain location information of the first transmission bandwidth using the receiving unit 12, or that the processing unit 11 obtains the frequency domain location information of the first transmission bandwidth may further include that the receiving unit 12 being further configured to extract a characteristic signal from the first transmission bandwidth by means of blind detection, and the processing unit 11 being further configured to determine the frequency domain location information of the first transmission bandwidth according to the characteristic signal in the receiving unit 12, where the characteristic signal is used to reflect the size and the location of the first transmission bandwidth.

The bandwidth of the UE overlaps a bandwidth of at least one UE of other UEs, and the first transmission bandwidth is all or a part of the overlapping part. In this way, multiple UEs may receive, over the first transmission bandwidth at the same time, the common information sent by the base station. That is, the base station may deliver multiple pieces of common information to multiple UEs at once, thereby avoiding problems that because the base station separately sends the common information to each UE, a communication rate is decreased and signalling overheads of the base station are increased. In addition, because the first transmission bandwidth is configured in each UE to receive the common information sent by the base station, no conflict occurs between bandwidth resources used by the UEs, and the base station may separately serve each UE (that is, standalone), thereby improving communication performance between the base station and the UEs.

Further, that the UE receives, over the first transmission bandwidth according to the size and the location of the first transmission bandwidth, the second common information sent by the base station includes that the receiving unit 12 being further configured to receive first location information that is of the second common information and that is sent by the base station, where the first location information is used to determine a receiving location of the second common information in the bandwidth of the UE, the processing unit 11 being further configured to determine a first location of the second common information according to the first location information in the receiving unit 12 and a first offset, where the first location is located in the first transmission bandwidth, and the first offset is used to indicate a location offset of the first transmission bandwidth in the bandwidth of the UE, and the receiving unit 12 being further configured to receive, at the first location in the processing unit 11, the second common information sent by the base station.

The receiving unit 12 is further configured to receive the first offset sent by the base station.

Optionally, the UE may also include a memory (not shown). The memory, the processor, and the communications interface are connected to and communicate with each other using the bus. Further, the memory may be configured to store the first offset received by the receiving unit 12 such that the processor determines, by invoking the first offset stored in the memory, the first location of the second common information according to the first location information received by the receiving unit 12 and the stored first offset.

Further, the processing unit 11 is further configured to determine the first offset according to the frequency domain location information.

Similarly, that the UE receives, over the first transmission bandwidth according to the size and the location of the first transmission bandwidth, the second common information sent by the base station may further include that the receiving unit 12 being further configured to receive second location information that is of the second common information and that is sent by the base station, where the second location information is used to indicate a receiving location of the second common information in the first transmission bandwidth, the processing unit 11 being further configured to determine a second location of the second common information according to the second location information of the second common information in the receiving unit 12, where the second location is located in the first transmission bandwidth, and the receiving unit 12 being further configured to receive, at the second location in the processing unit 11, the second common information sent by the base station.

Figure 7:
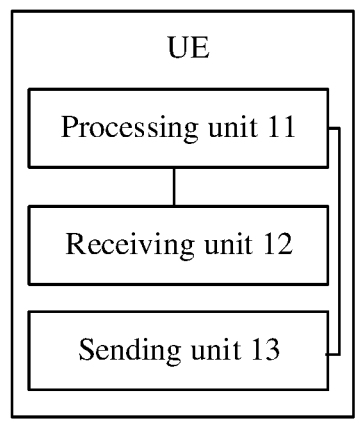
FIG. 7 is a second schematic structural diagram of UE according to an embodiment of the present disclosure.

Further, as shown in FIG. 7, the UE further includes a sending unit 13. Further, the receiving unit 12 is further configured to receive information that is about a second offset and that is sent by the base station, where the second offset is used to indicate a location offset that is of a frequency domain location used to transmit uplink information and that is in the bandwidth of the UE. The processing unit 11 is further configured to determine, according to a resource location at which the common information is received and the information about the second offset in the receiving unit 12, an uplink resource location at which the UE sends the uplink information to the base station, and the sending unit 13 is configured to send the uplink information at the uplink resource location determined in the processing unit 11.

Optionally, the sending unit 13 may also be one of the foregoing any communications interface. This is not limited in the present disclosure.

In the UE provided in this embodiment of the present disclosure, the UE obtains frequency domain location information of a first transmission bandwidth, and determines a size and a location of the first transmission bandwidth in a bandwidth of the UE, and then a base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

Embodiment 5

Figure 8:
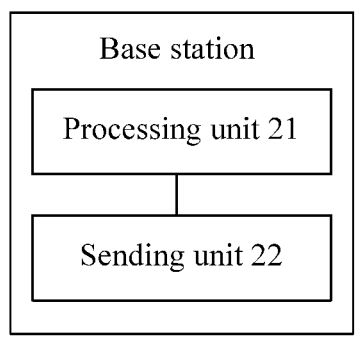
FIG. 8 is a schematic structural diagram of a base station according to an embodiment of the present disclosure.

As shown in FIG. 8, FIG. 8 is a schematic structural diagram of a base station according to this embodiment of the present disclosure. The base station includes a processing unit 21 configured to determine a size and a location of a first transmission bandwidth in a bandwidth of the base station, and a sending unit 22 configured to send common information to UE over the first transmission bandwidth according to the size and the location of the first transmission bandwidth in the bandwidth of the base station that are determined by the processing unit 21.

Optionally, the processing unit 21 used in this embodiment of the present disclosure may be a processor in the base station, and the sending unit 22 may be any communications interface in the base station. The processor and the communications interface may be connected to and communicate with each other using a bus. The processor is a control center of the base station. The processor performs various functions of the UE by processing data received by the communications interface. The communications interface may be implemented using an optical communications interface, an electrical communications interface, a wireless communications interface, or any combination thereof. For example, the optical communications interface may be an SFP communications interface (such as a transceiver), an SFP+ communications interface, or an XFP communications interface. The electrical communications interface may be an Ethernet NIC. The wireless communications interface may be a WNIC. In addition, the base station may have multiple communications interfaces.

Further, the common information sent by the sending unit 22 includes at least one of the common information, first common information, second common information, or third common information, where the first common information includes information transmitted using a PCFICH, a PHICH, a PDCCH, or an EPDCCH, or the second common information includes at least one of an SIB, an RAR, or paging information, or the third common information includes at least one of an MIB, a PSS, an SSS, or a DRS.

Further, after the processing unit 21 determines the size and the location of the first transmission bandwidth in the bandwidth of the base station, the sending unit 22 is further configured to semi-statically transmit frequency domain location information to the UE, where the frequency domain location information is used to determine a size and a location of the first transmission bandwidth in a bandwidth of the UE, or the sending unit 22 is further configured to send a characteristic signal to the UE, where the characteristic signal is used to determine a size and a location of the first transmission bandwidth in a bandwidth of the UE.

The bandwidth of the UE overlaps a bandwidth of at least one UE of other UEs, and the first transmission bandwidth is all or a part of the overlapping part. In this way, multiple UEs may receive, over the first transmission bandwidth at the same time, the common information sent by the base station. That is, the base station may deliver multiple pieces of common information to multiple UEs at once, thereby avoiding problems that because the base station separately sends the common information to each UE, a communication rate is decreased and signalling overheads of the base station are increased. In addition, because the first transmission bandwidth is configured in each UE to receive the common information sent by the base station, no conflict occurs between bandwidth resources used by the UEs, and the base station may separately serve each UE (that is, standalone), thereby improving communication performance between the base station and the UEs.

Further, that the sending unit 22 sends the second common information to the UE over the first transmission bandwidth further includes that the sending unit 22 being further configured to send first location information to the UE, where the first location information is used to determine a first location of the second common information, the processing unit 21 being further configured to determine the first location according to the first location information in the sending unit 22 and a first offset, where the first location is located in the first transmission bandwidth, and the first offset is used to indicate a location offset of the first transmission bandwidth in the bandwidth of the UE, and the sending unit 22 being further configured to send the second common information to the UE according to the first location determined in the processing unit 21.

Similarly, that the sending unit 22 sends the second common information to the UE over the first transmission bandwidth may further include that the sending unit 22 being further configured to send second location information to the UE, where the second location information is used to indicate a second location of the second common information in the first transmission bandwidth, the processing unit 21 being further configured to determine the second location according to the second location information in the sending unit 22, where the second location is located in the first transmission bandwidth, and the sending unit 22 being further configured to send the second common information to the UE according to the second location determined in the processing unit 21.

The sending unit 22 is further configured to send information about a second offset to the UE, where the second offset is used to indicate a location offset that is of a frequency domain location used to transmit uplink information and that is in the bandwidth of the UE.

In the base station provided in this embodiment of the present disclosure, the UE obtains frequency domain location information of a first transmission bandwidth, and determines a size and a location of the first transmission bandwidth in a bandwidth of the UE, and then the base station sends common information to the UE over the first transmission bandwidth. In this way, when the first transmission bandwidth is located in an overlapping part of bandwidths of multiple UEs, the base station may deliver the common information to the multiple UEs at once. That is, the base station may send the common information to the multiple UEs at the same time in a sharing manner, thereby avoiding problems that because the base station needs to separately send the common information to each UE, a communication rate is decreased and signalling overheads of the base station are increased.

This specification describes various aspects with reference to a terminal and/or a base station.

The UE may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the RAN. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or UE.

The base station (for example, an access point) may refer to a device in communication with a wireless terminal via one or more sectors at an air interface in an access network. The base station may be configured to mutually convert a received over-the-air frame and an Internet protocol (IP) packet and serve as a router between the wireless terminal and a rest portion of the access network, where the rest portion of the access network may include an IP network. The base station may coordinate attribute management of the air interface. For example, the base station may be a base transceiver station (BTS) in global system for mobile communication (GSM) or code division multiple access (CDMA), may also be a NodeB in wide band CDMA (WCDMA), and may further be an evolved NodeB (eNB or e-NodeB) in the LTE, which is not limited in the present disclosure.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A common information transmission method, comprising:
    obtaining, by user equipment (UE), frequency domain location information of a first transmission bandwidth;
    determining, by the UE, a size and a location of the first transmission bandwidth in a bandwidth of the UE according to the frequency domain location information, wherein the bandwidth of the UE is one of system bandwidths; and
    receiving, by the UE over the first transmission bandwidth according to the size and the location of the first transmission bandwidth, common information from a base station,
    wherein the common information from the base station is first common information or second common information,
    wherein the first common information comprises information transmitted using a physical control format indicator channel (PCFICH), a physical hyrbid automatic repeat request indicator channel (PHICH), a common physical downlink control channel (PDCCH), or a common enhanced physical downlink control channel (EPDCCH), or the second common information comprises at least one of a system information block (SIB), a random access response (RAR), or paging information, and
    wherein receiving the common information from the base station comprises:
        receiving, by the UE, first location information of the second common information from the base station, wherein the first location information determines a receiving location of the second common information in the bandwidth of the UE;
        determining, by the UE, a first location of the second common information according to the first location information and a first offset, wherein the first location is located in the first transmission bandwidth, and wherein the first offset indicates a location offset of the first transmission bandwidth in the bandwidth of the UE; and
        receiving, by the UE at the first location, the second common information from the base station.

2. The method of claim 1, wherein obtaining the frequency domain location information of the first transmission bandwidth comprises:
    receiving, by the UE, the frequency domain location information of the first transmission bandwidth that is semi-statically transmitted by the base station; or
    extracting, by the UE, a characteristic signal from the first transmission bandwidth by blind detection in order to determine the frequency domain location information of the first transmission bandwidth, wherein the characteristic signal reflects the size and the location of the first transmission bandwidth.

3. The method of claim 1, further comprising:
    receiving, by the UE, information about a second offset from the base station, wherein the second offset indicates a location offset of a frequency domain location used to transmit uplink information in the bandwidth of the UE;
    determining, by the UE according to a resource location at which the common information is received and the information about the second offset, an uplink resource location at which the UE sends the uplink information to the base station; and
    sending, by the UE at the uplink resource location, the uplink information to the base station.

4. A common information transmission method, comprising:
    determining, by a base station, a size and a location of a first transmission bandwidth in a bandwidth of the base station; and
    sending, by the base station, common information to user equipment (UE) over the first transmission bandwidth according to the size and the location of the first transmission bandwidth in the bandwidth of the base station,
    wherein the common information from the base station is first common information or second common information,
    wherein the first common information comprises information transmitted using a physical control format indicator channel (PCFICH), a physical hyrbid automatic repeat request indicator channel (PHICH), a common physical downlink control channel (PDCCH), or a common enhanced physical downlink control channel (EPDCCH), or the second common information comprises at least one of a system information block (SIB), a random access response (RAR), or paging information, and
    wherein sending the second common information to the UE over the first transmission bandwidth comprises:
        sending, by the base station, first location information to the UE, wherein the first location information determines a first location of the second common information, and wherein the first location is located in the first transmission bandwidth; and
        sending, by the base station, the second common information to the UE according to the first location.

5. The method of claim 4, wherein after determining the size and the location of the first transmission bandwidth in the bandwidth of the base station, the method further comprises:
    semi-statically transmitting, by the base station, frequency domain location information to the UE, wherein the frequency domain location information determines a size and a location of the first transmission bandwidth in a bandwidth of the UE; or sending, by the base station, a characteristic signal to the UE, wherein the characteristic signal determine the size and the location of the first transmission bandwidth in the bandwidth of the UE.

6. The method of claim 4, wherein after sending the common information to the UE over the first transmission bandwidth, the method further comprises sending, by the base station, information about a second offset to the UE, wherein the second offset indicates a location offset of a frequency domain location used to transmit uplink information in a bandwidth of the UE.

7. An apparatus, comprising:
a processor configured to:
obtain frequency domain location information of a first transmission bandwidth; and
determine a size and a location of the first transmission bandwidth in a bandwidth of user equipment (UE) according to the frequency domain location information, wherein the bandwidth of the UE is one of system bandwidths; and
a receiver coupled to the processor and configured to receive, over the first transmission bandwidth according to the size and the location of the first transmission bandwidth determined by the processor, common information from a base station,
wherein the common information from the base station is first common information or second common information,
wherein the first common information comprises information transmitted using a physical control format indicator channel (PCFICH), a physical hyrbid automatic repeat request indicator channel (PHICH), a common physical downlink control channel (PDCCH), or a common enhanced physical downlink control channel (EPDCCH), or the second common information comprises at least one of a system information block (SIB), a random access response (RAR), or paging information,
wherein the receiver is further configured to receive first location information of the second common information from the base station,
wherein the first location information determines a receiving location of the second common information in the bandwidth of the UE,
wherein the processor is further configured to determine a first location of the second common information according to the first location information and a first offset,
wherein the first location is located in the first transmission bandwidth,
wherein the first offset indicates a location offset of the first transmission bandwidth in the bandwidth of the UE, and
wherein the receiver is further configured to receive, at the first location, the second common information from the base station.

8. The apparatus of claim 7, wherein the receiver is further configured to receive the frequency domain location information of the first transmission bandwidth that is semi-statically transmitted by the base station, and wherein the processor is further configured to obtain the frequency domain location information of the first transmission bandwidth using the receiver; or
the receiver is further configured to extract a characteristic signal from the first transmission bandwidth by blind detection, wherein the processor is further configured to determine the frequency domain location information of the first transmission bandwidth according to the characteristic signal in the receiver, and wherein the characteristic signal reflects the size and the location of the first transmission bandwidth.

9. The apparatus of claim 7, wherein the receiver is further configured to receive information about a second offset from the base station, wherein the second offset indicates a location offset of a frequency domain location used to transmit uplink information in the bandwidth of the UE, wherein the processor is further configured to determine, according to a resource location at which the common information is received and the information about the second offset, an uplink resource location at which the UE sends the uplink information to the base station, and wherein the UE further comprises a transmitter coupled to the receiver and the processor and configured to send the uplink information at the uplink resource location.

10. An apparatus, comprising:
a processor configured to determine a size and a location of a first transmission bandwidth in a bandwidth of a base station; and
a transmitter coupled to the processor and configured to send common information to user equipment (UE) over the first transmission bandwidth according to the size and the location of the first transmission bandwidth in the bandwidth of the base station determined by the processor,
wherein the common information from the base station is first common information or second common information,
wherein the first common information comprises information transmitted using a physical control format indicator channel (PCFICH), a physical hyrbid automatic repeat request indicator channel (PHICH), a common physical downlink control channel (PDCCH), or a common enhanced physical downlink control channel (EPDCCH), or the second common information comprises at least one of a system information block (SIB), a random access response (RAR), or paging information,
wherein the transmitter is further configured to send first location information to the UE,
wherein the first location information determines a first location of the second common information,
wherein the processor is further configured to determine the first location according to the first location information and a first offset,
wherein the first location is located in the first transmission bandwidth,
wherein the first offset indicates a location offset of the first transmission bandwidth in the bandwidth of the UE, and
wherein the transmitter is further configured to send the second common information to the UE according to the first location.

11. The apparatus of claim 10, wherein the transmitter is further configured to:
semi-statically transmit frequency domain location information to the UE, wherein the frequency domain location information determines a size and a location of the first transmission bandwidth in a bandwidth of the UE; or send a characteristic signal to the UE, wherein the characteristic signal determines the size and the location of the first transmission bandwidth in the bandwidth of the UE.

12. The apparatus of claim 10, wherein the transmitter is further configured to send information about a second offset to the UE, and wherein the second offset indicates a location offset of a frequency domain location used to transmit uplink information in a bandwidth of the UE.

* * * * *